United States Patent

Borgens, Jr. et al.

[11] Patent Number: 5,139,010
[45] Date of Patent: Aug. 18, 1992

[54] SOLAR OVEN

[75] Inventors: Edward G. Borgens, Jr.; Helen A. Borgens, both of Rancho Cucamonga; Melvin H. M. Best, Topanga; Paul K. Janowski, Simi, all of Calif.

[73] Assignee: The Solar Gourmet Corporation, Ranco Cucamonga, Calif.

[21] Appl. No.: 656,407

[22] Filed: Feb. 14, 1991

[51] Int. Cl.$^5$ ............................................. F24J 2/02
[52] U.S. Cl. .................................... 126/451; 126/438
[58] Field of Search ............... 126/438, 424, 425, 439, 126/430, 436, 451, 450, 417, 443

[56] References Cited

U.S. PATENT DOCUMENTS

| | | | |
|---|---|---|---|
| 3,301,171 | 1/1967 | Steinberg | 126/451 |
| 3,797,476 | 3/1974 | Tarcici | 126/424 |
| 3,938,497 | 2/1976 | Andrassy | 126/451 |
| 4,077,391 | 3/1978 | Way, Jr. | 126/451 |
| 4,125,109 | 11/1978 | Erwin | 126/451 |
| 4,130,106 | 12/1978 | Clevett et al. | 126/451 |
| 4,203,427 | 5/1980 | Way, Jr. | 126/451 |
| 4,220,141 | 9/1980 | Way, Jr. | 126/451 |
| 4,224,927 | 1/1980 | Patil | 126/450 |
| 4,292,957 | 10/1981 | Golder | 126/451 |
| 4,586,277 | 5/1986 | Cornell | 126/438 |
| 4,637,376 | 1/1987 | Varney | 125/451 |
| 4,655,196 | 4/1987 | Kerr | 126/451 |
| 4,696,285 | 9/1987 | Zwach | 126/451 |

FOREIGN PATENT DOCUMENTS

| | | | |
|---|---|---|---|
| 2441808 | 7/1980 | France | 126/451 |
| 2523277 | 9/1983 | France | 126/451 |

*Primary Examiner*—James C. Yeung
*Attorney, Agent, or Firm*—Kenneth L. Sherman

[57] ABSTRACT

A portable solar oven which innovatively combines improved elements to achieve and maintain a high internal temperature. In the shown embodiment, a box-shaped insulated body shell includes a pair of side walls, a front wall, a back wall, and a base. The front wall has an insulated door made integral therewith. The inner portion of the side walls and door have polished metal panels affixed thereto to reflect solar radiation into the interior of the oven. The back wall and base have a heat element disposed thereon for collecting direct and reflected solar radiation, thereby maintaining a high constant temperature in the interior of the oven. A transparent top wall of dual pane tempered glass is permanently affixed to the topmost portion of the body shell. A reflective cover is rotatably affixed to either side of the body shell using a pair of toothed washers. The reflective cover reflects additional solar radiation into the inner portion of the oven.

16 Claims, 3 Drawing Sheets

SOLAR OVEN

FIELD OF THE INVENTION

The subject invention relates generally to ovens and, more particularly, to a portable solar oven.

BACKGROUND OF THE INVENTION

One of the problems associated with solar ovens is that their construction does not afford frequent use over an extended period of time. Furthermore, designs are not capable of maintaining high, constant cooking temperatures.

A great number of prior art solar ovens, because of their lack of weight and size, are considered "portable," while fewer solar ovens are considered "nonportable." An example of a nonportable solar oven is disclosed in U.S. Pat. No. 4,655,196, by Kerr. The Kerr solar oven is adapted to be permanently installed in an exterior wall of a building. The Kerr oven has an access door system which opens through the exterior building wall into the kitchen. A plurality of reflective panels direct sunlight through a glass front wall into the oven. The oven also includes a heat absorbing element onto which cooking vessels may be placed for cooking food. Another example of a nonportable solar cooker is disclosed in U.S. Pat. No. 4,696,285, by Zwach.

Among the many disadvantages of existing portable solar ovens currently available are the materials of which they are constructed and the construction techniques used to assemble those materials. One such portable oven is manufactured by Kerr-Cole of Tempe, Arizona. The Kerr-Cole solar oven includes materials such as corrugated cardboard, foil, glass, wood moldings, contact paper, and crumpled newspaper insulation. As can be readily surmised, exposure of the Kerr-Cole solar oven to such adverse elements as rain or wind results in the Kerr-Cole oven having diminished structural integrity.

Another portable solar oven is manufactured by the Burns-Milwaukee Corporation of Milwaukee, Wisconsin. The Burns-Milwaukee solar oven includes a vinyl exterior case having a black metal box disposed therein. Fiberglass insulation is placed between the metal box and the exterior case.

The Burns-Milwaukee case is covered with a single hinged pane of glass. A four-sided polished aluminum reflector is attached to the outer periphery of the solar oven to increase the amount of sunlight entering the interior of the metal box. A swinging shelf is in the interior of the metal box upon which food may be placed.

In use, the box is tipped forward and secured in any one of ten positions. These positions are indicated by ridges molded into the exterior case. The various positions are promoted for allowing sun exposure to the interior of the metal box.

One disadvantage of the Burns-Milwaukee solar oven is that it is light, and wind against the exterior of the case may cause jarring of the oven and result in a cooking vessel's contents spilling. A further disadvantage is that the lack of weight and loose attachment of the four-sided polished reflector allows it to be blown from the solar oven by a light breeze. This may result in damage, and cause jarring of the oven. This jarring may result in the spilling of a cooking vessel's contents inside the box. Additionally, with the use of the foursided reflector, the oven's position must be adjusted regularly to face the sun so that the reflector does not block the sunlight from the interior of the metal box.

A disadvantage of these ovens is that food is placed in the oven through the top. When accessing the inner portion of the oven through the top, a heat loss of at least 25° F. is unavoidable. Thus, as food is cooking and repeatedly being checked for "doneness," the time necessary to cook food in the oven is increased, since the average temperature is greatly diminished. The Burns-Milwaukee solar oven has a maximum achievable temperature of 375° F. in warm summer months, with a maximum average temperature of 290° F. to 300° F., for no more than one and one-half hours on clear days. The Kerr-Cole solar oven has a maximum achievable temperature of 250° F. in summer months.

OBJECTS OF THE INVENTION

As can be appreciated, there exists a need for a portable solar oven that is constructed of materials that are not subject to adverse weather conditions, and that is capable of achieving a high interior temperature and maintaining it for an extended period of time.

It is therefore one object of the present invention to provide a portable solar oven improved through an innovative combination of elements;

It is another object of the invention to provide a portable solar oven of materials substantially resilient to adverse weather conditions;

It is yet another object of the present invention to provide a solar oven that is capable of achieving a high internal temperature; and It is yet still a further object of the present invention to provide a solar oven that is capable of maintaining a high average temperature for an extended period of time.

SUMMARY OF THE INVENTION

These and other objects of the present invention are achieved by providing a portable solar oven which is constructed to be both durable and capable of achieving and maintaining a high interior cooking temperature. The oven is constructed in such a manner that it maximizes the incident radiation upon a heat element which collects, stores, and uniformly distributes IR radiation generated heat.

In the preferred embodiment the oven has an outer body shell of rigid plastic with a protective coating. The body shell includes a pair of side walls, a front and back wall, and a base. The front wall has a door for access.

The interior periphery of the side walls and door has a reflective material affixed. The back wall and base have a heat element which retains heat in the interior of the oven. A dual pane transparent top allows sunlight to pass into the interior of the oven.

An upwardly-opening reflective cover is rotatably mounted to the outer periphery of the side walls. The reflective cover reflects sunlight into the oven's interior to increase cooking temperature.

BRIEF DESCRIPTION OF THE DRAWINGS

The present invention, both as to its organization and manner of operation, together with further objects and advantages thereof, may be understood by reference to the following drawings.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in these arts, since the generic principles of the present invention have been defined herein.

Figure 1:
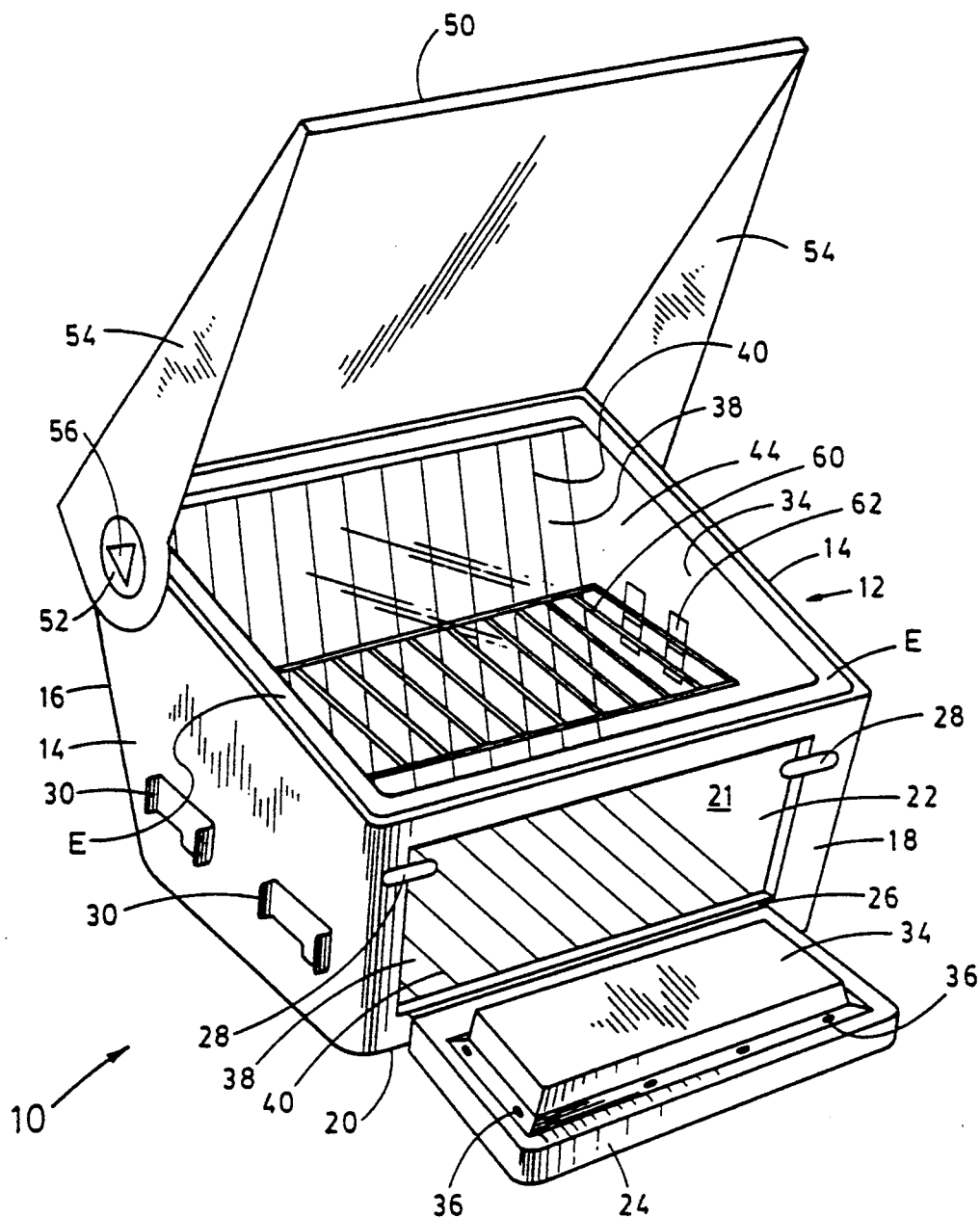
FIG. 1 is a perspective view of the preferred embodiment of the present invention.

FIG. 1 shows the preferred embodiment of the invention. The solar powered oven 10 includes a substantially box-shaped body shell 12. In the preferred embodiment, the shell 12 is made from suitable rigid plastic, such as acryl butyl styrene, for example, which may be 0.375-inch thick. The shell 12 has a Rovele® protective coating.

The body shell 12 has a pair of side walls 14, a back wall 16, a front wall 18, and a base 20 for forming an oven interior 21. The front wall 1 has a large rectangular opening 22.

A door 24 is affixed to the bottommost portion of the front wall 18 along the lower periphery of the opening 22 by an elongated hinge 26. The door 24 is placed on the oven front 18 and is low to allow easy access and retain heat within the oven when the door is opened. The door 24 is made from the same material as the shell 12, and covers the opening 22, thereby preventing heat from escaping the interior 21 of the oven 10.

A pair of J-shaped latches 28 are rotatably mounted on either side of the topmost periphery of the opening 22. The latches 28 retain the door 24 in a closed position when the oven 10 is in use.

A pair of handles 30 on either side wall 14 aid in lifting the oven 10 for transportation.

Affixed to the interior portion of either side wall 14 is a sheet of reflective metal 34. This sheet 34 may be aluminum, for example. An additional sheet of reflective metal 34 is affixed to the interior portion of the door 24 using a plurality of affixing means 36, such as screws.

The reflective metal 34 is retained around the top edge of the side walls 14 using a dual pane transparent top 44 and extrusion E to secure the top edge in place and a heat element 38 to secure the bottom edge in place. A minimal amount of silicone adhesive may be used. In the preferred embodiment, the metal 34 may be polished to a reflectivity factor of 0.9, to aid the reflection of sunlight into the oven's interior 21.

Sitting in place against the interior portion of the back wall 16 and base 20 is a heat element 38. In the preferred embodiment the heat element 38 is actually a pair of heat elements 38. However, the heat element 38 is only divided into two parts for ease of manufacture. The heat element 38 operates as a single element and should be thought of as such. The heat element 38 is an assembly made by riveting two like parts 38 together along an angled ridge C (see FIG. 2). This allows the heat element 38 to conduct heat across the angled ridge C.

The heat element 38 may be anodized aluminum with a lamination of black teflon. In this embodiment teflon is cured onto the heat element at substantially 700° F. for approximately 45 minutes. The heat element 38 is approximately ½-inch thick.

Figure 3:
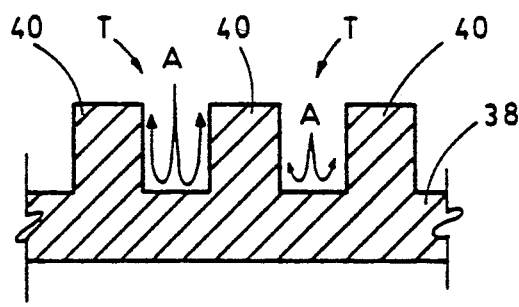
FIG. 3 is a magnified side view of a heat element of the preferred embodiment.

As shown in FIG. 3, the heat element 38 has a plurality of spatially-positioned, parallel ridges or fins 40. In the preferred embodiment, the fins 40 have a period so that they are spaced one inch apart, and are 3/16-inch thick and ¼-inch in height. This configuration allows air to flow along the heat element and provides convection current cooking by circulating hot air uniformly around a cooking pot. The air is heated by the heat element 38 and flows along through a trough T as shown by arrows A.

The fins 40 taper in thickness, with the greater thickness being at the angled ridge C. This encourages heat which has been collected at the outer edges of the heat element 38 to be conducted towards the center of the oven where the heat element 38 has the greatest mass. This aluminum mass heat storage is one factor that allows this oven to maintain a consistently high temperature even when the sun is obscured by clouds or the access door 24 is opened.

Figure 2:
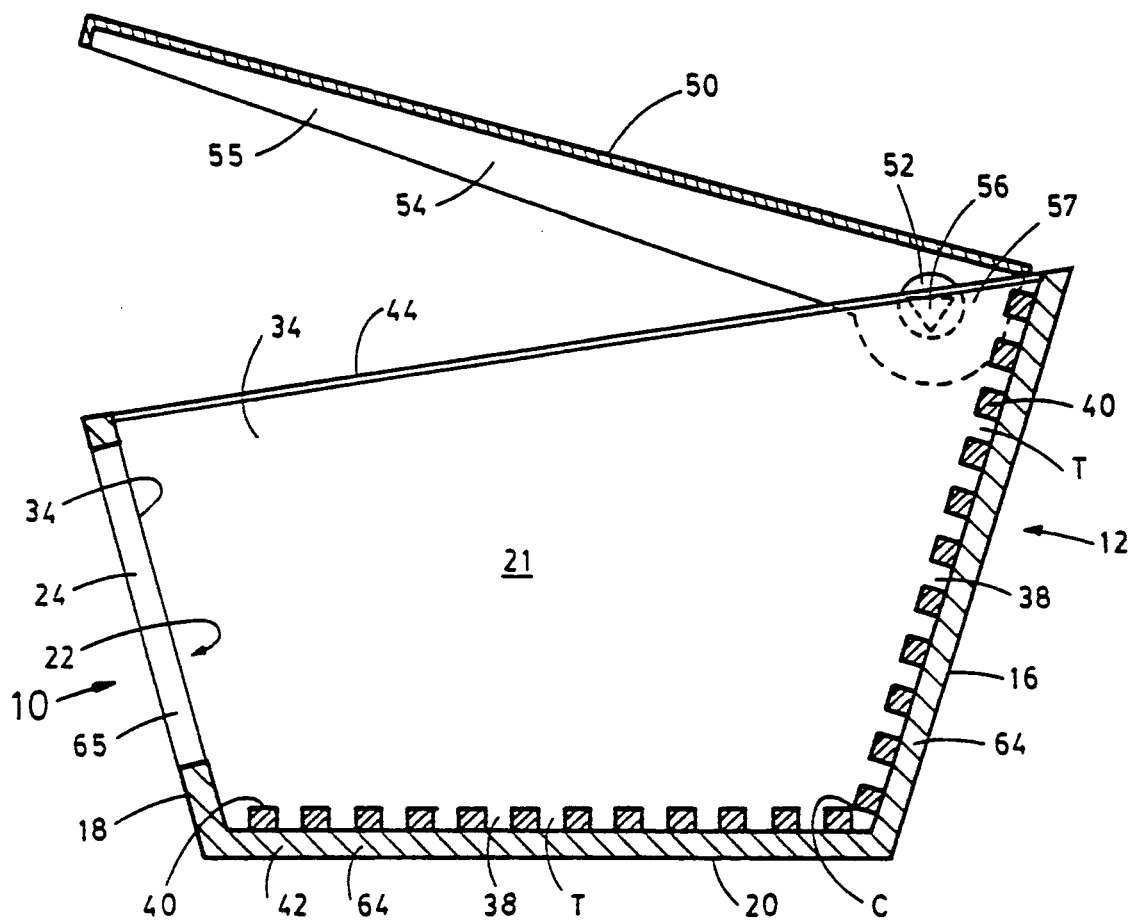
FIG. 2 is a schematic side view of the preferred embodiment.

Disposed between the inner periphery of the shell 12 and outer portion of the polished aluminum 34 and heat element 38 is a layer of insulation 42 (shown in FIG. 2). In the preferred embodiment, the insulation 42 is any suitable commercially-available foamglass insulation, such as Pittsburgh-Corning Foamglass. The amount of insulation 42 required to properly insulate the oven 10 is approximately 15 square feet.

The embodied solar oven 10 has a transparent top wall 44 permanently affixed to a topmost portion of the body shell 12. In the preferred embodiment, the transparent top wall 44 is dual pane tempered glass, such as that manufactured by Trident Consolidated Industries, Inc., and is sloped to maximize the incident radiation into the oven and, specifically, upon the heat element 38. In the preferred embodiment, the dual pane tempered glass 44 includes two 5/32-inch-thick glass panes $P_1$, $P_2$ disposed 4/32-inch from each other to form an air space 45. It is found that the air space 45 between the glass panes $P_1$, $P_2$ should be minimized in order to maximize the transference of the long wavelength IR radiation for cooking, yet still maintain a high level of temperature within the oven 10.

A breathing tube 48 is inserted into the air space 45 between the two panes $P_1$, $P_2$ in the center of the top-back edge of the dual pane transparent top 44. When the portable solar oven 10 is transported between significant elevation height variations, the breathing tube allows air pressure in the air space 45 to be equalized, thereby alleviating expansion or contraction of the two panes $P_1$, $P_2$ and subsequent damage to the panes $P_1$, $P_2$. The dual pane transparent top 44 sits on top of the glass extrusion E encompassing the top edge perimeter of the body shell 12. A minimal amount of silicone adhesive (not shown) may be used to affix the transparent top wall 44 to the extrusion E.

Figure 4:
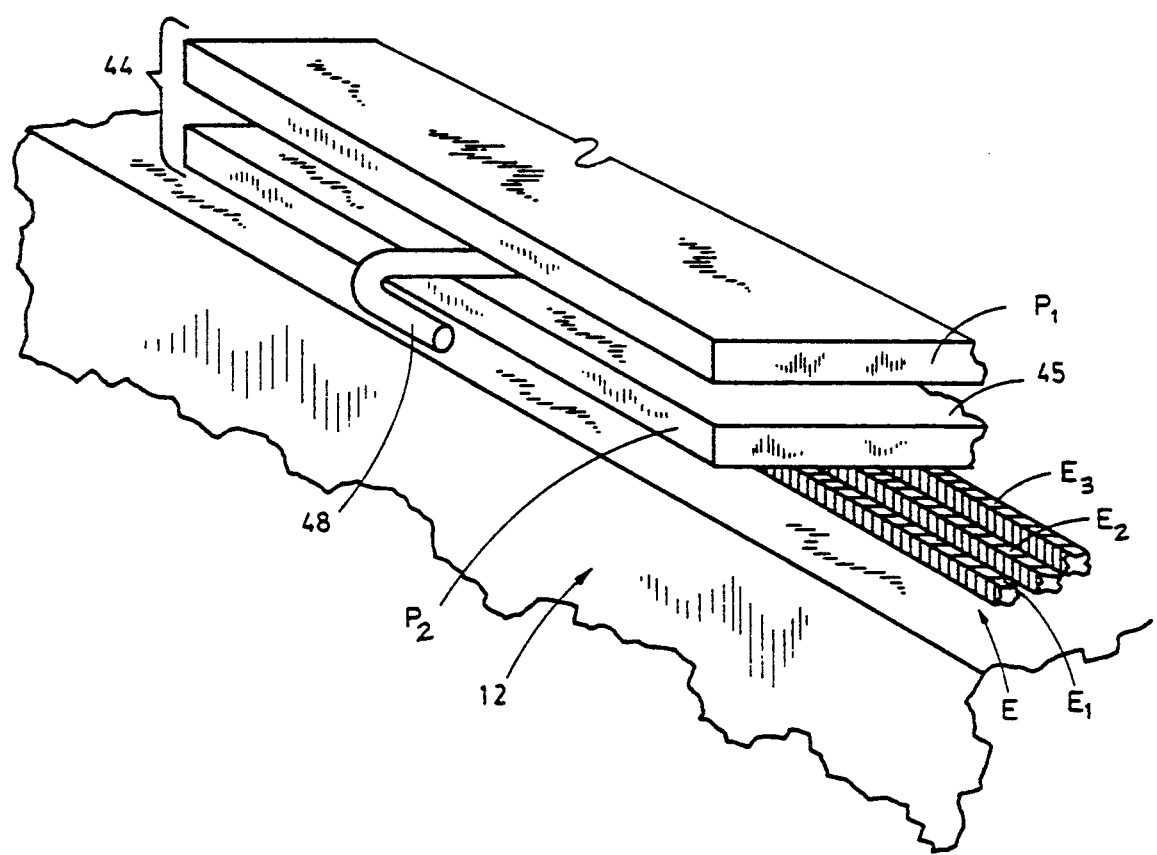
FIG. 4 is a magnified perspective view of a transparent top wall used with the preferred embodiment of the invented solar oven.

As shown in FIG. 4, the breathing tube 48 may be disposed through the frame holding the panes $P_1$, $P_2$ to aid removal of air from the air space 45. The tube 48 may be crimped when the oven 10 is used and cut when the oven 10 is transported. This allows the maintenance of a heat buffer in the glass panes $P_1$, $P_2$ so that heat will not escape through the top of the oven, but also allows pressure equalization maintenance when the oven is transported for use at different altitudes.

As shown in FIG. 4, the transparent top 44 is mounted upon the body shell 12 whereby the top edge of body shell 12 is trimmed with a silicone rubber extrusion E which covers the edges of the shell 12, insulation 42, and interior sheet metal 34. This extrusion E also provides compressible ridges $E_1$, $E_2$, $E_3$ for the transparent top wall 44 to press against, sealing the top of the oven 10.

A reflective cover 50, which may be aluminum, is rotatably affixed to the outer portion of either side wall 14. The reflective cover 50 is affixed to a topmost portion of either side wall 14 proximal to the back wall 16, using a pair of circular toothed washers 52.

The reflective cover 50 has a pair of triangular elongated side panels 54. A circular knob 56 is disposed on the outer periphery of either elongated triangular side panel 54 for frictionally engaging or disengaging toothed members of the circular toothed washers 52.

The reflective cover 50 and side panels 54 have undersides 58 that may be polished to a 0.8 reflectivity factor.

Located in the inner periphery of the oven 10 is a conventional oven rack 60. In the preferred embodiment, the rack 60 is 11 inches in length and 21 inches in width. Two pairs of rack holders 62 are affixed to the reflective metal 34. The rack holders 62 enable vertical adjustment of the oven rack 60.

FIG. 2 shows a side view of the preferred embodiment of the invention 10.

The back wall 16 and front wall 18 both extend away from the base 20 at an angle of substantially 105 degrees. The angle of the front wall 18 in relation to the base 20 and transparent top wall 44 inhibits some of the unwanted escape of heat from the oven's interior 21 when the door 24 is open.

In the preferred embodiment, the exterior dimensions of the back wall 16 are 21 inches long by 25½ inches wide at the base and 2½ inches wide at the top, for example, while the front wall 18 is 17½ inches long by 25½ inches wide at the base and 27½ inches wide at the top. The exterior dimensions of the base 20 are 17½ inches long by 25½ inches wide, while the topmost portion of the body shell 12 is 29½ inches long and 28 inches wide. The transparent top wall 44 may be 28½ inches long and 27 inches wide to reside in the top inner periphery of the body shell 12. The opening 22 in the front wall 18 may be 10¾ inches in height and 19¾ inches wide, while the interior of the door 24 is slightly smaller so that it may be disposed through the opening 22.

In the preferred embodiment, the interior dimensions of the base portion 20 are 16 inches long by 20¾ inches wide. The interior dimensions of the back wall 16 are 16¼ inches in height and 20¾ inches in width. The interior height of the back wall 16 is 16 inches in height as measured from the outer side of the back wall heat element 38. The interior height of the front wall 18, as measured between the transparent top wall 44 and the interior of the base 20 is 12½ inches in height and 25½ inches in width. When measured from the outer side of the base heat element 38, the height is 13 inches. Both the base and back wall portions of the heat element 38 are 16 inches long by 20¾ inches wide, respectively.

A two-inch space 64 extends between the inner surface of the body shell 12, and the heat element 38 disposed on the back wall 16 and on the base 20, respectively. Further, there is a small space 65 provided between the outer portion of the door 24 and the reflective metal 34 affixed thereto. The insulation 42 is disposed throughout the spaces 64, 65 to facilitate retention of heat in the oven 10 and add structural integrity.

The reflective cover 50 is rotatably fixed to the body shell 12. The toothed washers 52 may be mounted to either side wall 14 3¼ inches below the transparent top wall 44 and 3¼ inches in from the outer periphery topmost portion of the back wall 16. The reflective cover 50 is 31¼ inches in length and 28¼ inches in width. The elongated sides 54 of the reflective cover 50 have a substantial taper thereto with a most narrow portion 55 proximal to the front wall 18, being one inch in width, and a wide portion thereof 57 proximal to the back wall 8¼ inches in width.

The wide portions 57 accommodate the circular knobs 56.

The invented solar oven 10 operates in the following manner: Food to be cooked is placed in a vessel (not shown), and placed into the oven 10 and onto the oven rack 60 or base of the heat element 38. The door 24 is closed and held in position by the J-shaped latches 28.

The reflective cover 50 is rotated upward to a desired angle with the transparent top wall 44. The reflective cover 50, when in position, is then held in that position by rotating the circular knobs 56 so that the toothed washers 52 engage. As sun rays enter directly through the transparent top wall 44 or reflect off the reflective cover 50 and penetrate through the transparent top wall 44, the solar radiation meets the absorbing heat element 38 and is transduced into infrared radiation, or heat, thus effectively cooking objects in the solar oven's interior 21. The dual glass transparent top wall 44 inhibits heat loss while the reflective cover 50 is raised for cooking purposes.

The heat element 38 absorbs the solar radiation to further increase the temperature of the interior 21 and preserve the longevity of the achieved temperature. The reflective metal sheets 34 affixed to the side walls 14 and door 24 further increase the amount of reflected sun rays in the interior 21 to increase and maintain the temperature of the interior 21. The ridges 40 disposed on the heat element 38 increase the surface area of the heat element 38 to further increase the temperature of the interior 21 and maintain a higher constant temperature for a longer period of time. The ridges 40 also enable heat to circulate under a cooking vessel placed thereon.

The solar oven of the preferred embodiment is comprised of durable, long-lasting materials. It is capable of achieving a substantially high temperature and maintaining the achieved temperature for an extended period of time.

While the above features of the preferred embodiment teach the general principles of the present invention, it can be readily appreciated that it would be possible to deviate from the above embodiment of the present invention and, as it will be readily understood by those skilled in the art, the invention is capable of many modifications and improvements within the scope and spirit thereof. Accordingly, it will be understood that the invention is not to be limited by the specific embodiments, but only by the spirit and scope of the appended claims.

What is claimed is:

1. A solar oven comprising:
   a body shell having an interior and including a top portion, walls and a base, one of said walls having an aperture with a door allowing access to the interior, the shell being box-shaped and having a pair of side walls, a front wall, and a back wall;

a heat retaining element within the interior for collecting, storing, and distributing solar energy, the heat retaining element having a plurality of spatially positioned ridges wherein the heat retaining element is affixed to the back wall and the base;

the top portion being transparent for allowing the solar energy to enter the interior; and an upwardly-opening reflective cover for reflecting solar energy into the interior.

2. The solar oven of claim 1 wherein said back wall extends away from said base at an obtuse angle, said front wall is shorter than said back wall, and portions of aid side walls adjacent said front wall are shorter than portions of said side walls adjacent said back wall, the front wall extending away from said base at an obtuse angle for inhibiting heat from escaping from the interior of the oven when the door is opened and the oven is in use.

3. The solar oven of claim 1 wherein an interior surface of said walls has a reflective material affixed.

4. The solar oven of claim 3 wherein the reflective material is aluminum polished to a substantially 0.9 reflectively factor affixed to the interior surfaces of the side walls and said door.

5. The solar oven of claim 1 wherein said top portion is dimensioned larger than said base.

6. The solar oven of claim 1 wherein said reflective cover is rotatably affixed to the outer periphery of said shell.

7. The solar oven of claim 6 wherein said reflective cover is rotatably affixed to the outer periphery of said side walls using a pair of substantially circular toothed washers for retaining said reflective cover in a desired position relative to said transparent top.

8. The solar oven of claim 1 wherein said transparent top is affixed to the side walls at right angles and is affixed to the front and back wall at acute angles.

9. The solar oven of claim 1 wherein said transparent top includes two panes of glass having a space therebetween, from which space a breathing tube is disposed therethrough.

10. The solar oven of claim 1 further including a pair of rotatable latches disposed on either side of said door.

11. The solar oven of claim 1 further including a strip of resilient plastic disposed between said body shell and the transparent top to inhibit heat loss from said oven.

12. The solar oven of claim 1 further including a strip of resilient plastic disposed between said body shell and the door to inhibit heat loss from said oven.

13. A solar oven comprising:

a substantially box-shaped body shell comprising acryl butyl styrene with Rovele ® protective coating, said body shell having a top portion and having a pair of side walls, a front wall and a back wall, and a base, said front wall having a door made integral therewith, the inner periphery of said side walls and said door having polished aluminum affixed thereto, said aluminum being polished to a substantially 0.9 reflectivity factor, said back wall and said base having a heat element comprising teflon-coated anodized aluminum affixed thereto, each of said walls extending generally outwardly from said base;

a transparent top wall comprising dual pane tempered glass dimensioned substantially larger than said base affixed to said top portion of said body shell, said glass having a first pane substantially 5/32-inch thick and having a second pane substantially 5/32-inch thick disposed substantially 4/32-inch from said first pane; and an upwardly opening reflective cover dimensioned to substantially cover said transparent top wall and having elongated sides, said cover comprising aluminum and having an underside thereof polished to a substantially 0.8 reflectivity factor.

14. A solar oven comprising:

a substantially box-shaped body shell having a protective coating disposed on an exterior surface thereof, said body shell having a top portion and having a pair of side walls, a front wall, a back wall, and a base for defining an interior, said front wall having a substantially large aperture disposed therethrough allowing access to the interior and a door rotatably coupled along one side of the aperture and sized to cover the aperture to prevent heat from escaping from the interior when said oven is in use, an interior surface of said side walls, said front wall, and said door having a reflective material affixed thereto, the front wall and the back wall extending away from said base at obtuse angles;

a heat retaining element attached to the back wall and said base for collecting, storing, and distributing solar energy, said heat retaining element having a plurality of spatially positioned ridges extending parallel to one another for allowing air to flow along said heat retaining element, said heat retaining element comprising a thermally conductive metal having a coating of substantially black, solar energy absorbing material thereon;

a transparent top wall affixed to the top portion of said body shell for allowing solar energy to enter the interior of said oven, said transparent top wall dimensioned substantially larger than said base, said transparent top wall including a first pane of tempered glass substantially 5/32-inch thick and a second pane of tempered glass substantially b 5/32-inch thick disposed substantially 4/32-inch from said first pane; and an upwardly opening reflective cover dimensioned to substantially cover said transparent top wall rotatably coupled to he bottom portion of said body shell and having tapered elongated sides, said cover comprising aluminum and having an underside thereof polished for reflecting solar energy into the interior of said oven.

15. The solar oven of claim 14 wherein the ridges on said heat retaining element are substantially 3/16-inch thick and ¼-inch in height and spaced substantially one inch apart.

16. The solar oven of claim 15 wherein the ridges on said heat retaining element taper in thickness, said ridges tapering in thickness to conduct solar energy absorbed around the periphery of said heat retaining element towards the center thereof.

* * * * *